Figure 1:
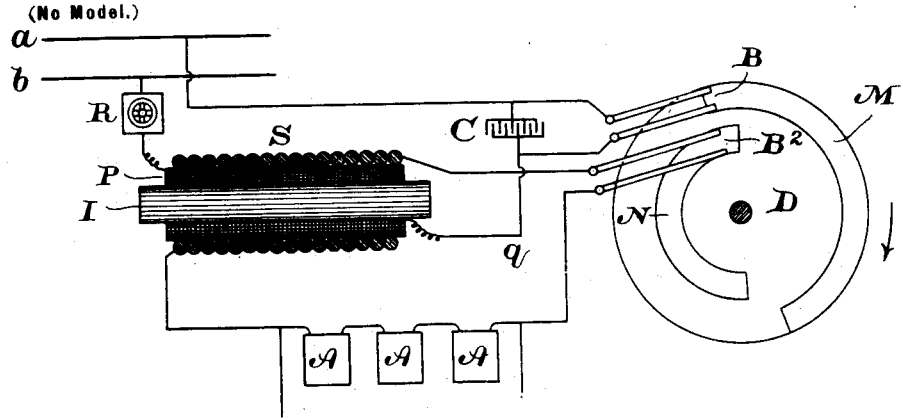

No. 712,741. Patented Nov. 4, 1902.
E. THOMSON.
APPARATUS FOR TRANSFERRING ELECTRIC ENERGY.
(Application filed Feb. 27, 1897.)
(No Model.)

WITNESSES.
INVENTOR.

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

APPARATUS FOR TRANSFERRING ELECTRIC ENERGY.

SPECIFICATION forming part of Letters Patent No. 712,741, dated November 4, 1902.

Application filed February 27, 1897. Serial No. 625,312. (No model.)

*To all whom it may concern:*

Be it known that I, ELIHU THOMSON, a citizen of the United States, residing at Swampscott, in the county of Essex, State of Massachusetts, have invented certain new and useful Improvements in Apparatus for Transferring Electric Energy, (Case No. 510,) of which the following is a specification.

My present invention relates to an apparatus for inductively transferring electric energy from a circuit in which flows a unidirectional current at one potential to another circuit at different potential, generally lower.

The mode of operation consists in energizing a core by a winding traversed for a period by the current, then interrupting the current-flow by a break-piece or contact-maker at the end of a given time, during which the magnetizable core has reached a considerable degree of magnetization, at or about the same time closing a circuit secondary to the first winding, which is virtually a closed-circuit secondary. In this latter circuit a current is induced which may be utilized in any desired way by other devices.

The apparatus which I use consists, in its simplest form, of a magnetizable iron core with two windings, one of which is the energizing primary put into circuit with a source of continuous current at intervals for magnetizing the core. The other winding is a secondary to the first, which as employed is practically though not completely a short circuit, and is closed immediately the first circuit is opened, either before or a little later than the opening of the first circuit. A suitable break-piece is furnished to close and open the circuits at proper intervals. I am thus enabled to take energy from a circuit the potential of which is, for example, one hundred volts (or even much higher) and transfer that energy at a different potential to the secondary circuit for doing work.

It is well known that considerable difficulty arises in the operation of an interrupted primary from such potentials as one hundred to five hundred volts on account of the spark at the break. While this sparking is moderated by the use of condensers, it is not easy to entirely get rid of its bad effects. For this reason induction-coils have generally been fed at potentials ranging from six to ten volts, for in this case the potential is not high enough to give rise to difficulties in breaking, especially when a condenser is used. In my invention, however, the presence of a closed secondary circuit closed at or about the moment of the opening of the primary circuit virtually transfers the current from the primary to the secondary and avoids the inductive spark at the break-piece in the former circuit. . To effect this, however, the secondary used should be not merely an ordinary secondary circuit, but a circuit the nature and proportions of which in relation to the work are such that it is virtually closed or much the same as if the secondary had been formed of a conductor closed upon itself. If, for example, the finer or primary coil be energized from a one-hundred-and-ten-volt circuit, the secondary might be wound so as to give an average potential of fifteen volts at its terminals, and in such case it could be connected to charge a battery giving a counter electromotive force of four volts, leaving eleven volts as the voltage giving the current through the secondary circuit. In such case the secondary if of very low resistance relatively works as if it were on closed circuit, which it is the object of my invention to secure.

The invention will be better understood by reference to the figures, in which—

Figure 2:
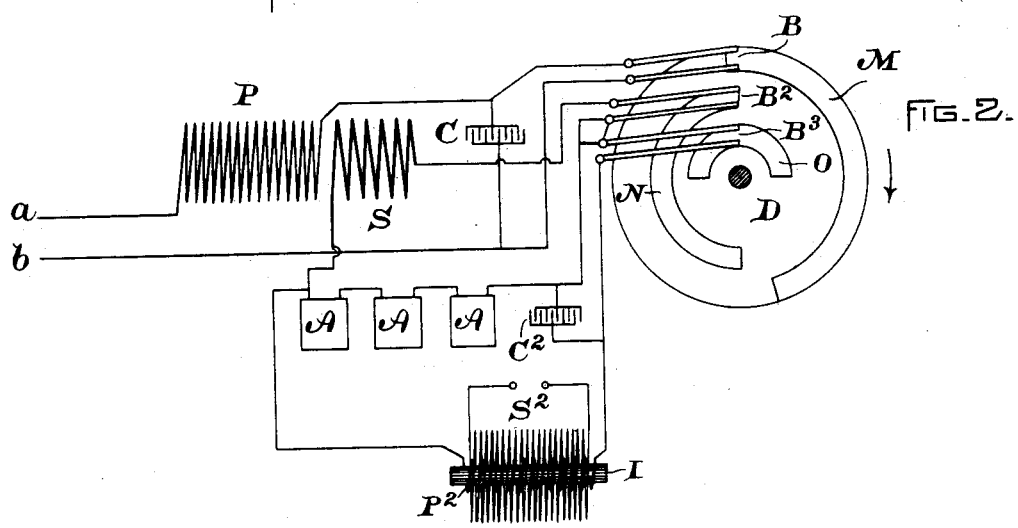
Figure 3:
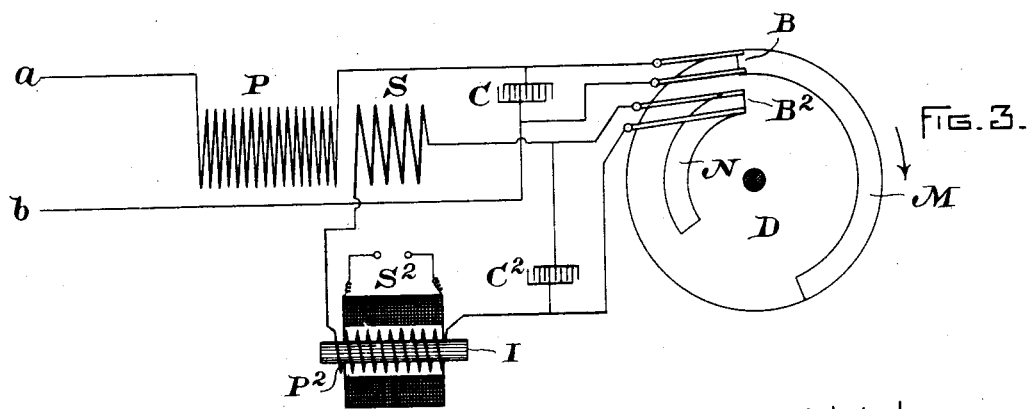

Figures 1, 2, and 3 are diagrammatic representations of the invention in some of its different modes of application.

In the figures, *a b* represent wires from a feeding-line at suitable constant potential. In Fig. 1 a branch taken from *b* through a regulating resistance at R (which may or may not be used) traverses a comparatively fine wire coil P of many turns wound upon an iron core or bundle of iron wires I. The other terminal of the coil P *q* passes to the lower of a pair of brushes B, the upper brush being connected back to the line. A segment M, of metal, carried on a revolving insulating cylinder or disk D, serves to connect the brushes B during a portion of the revolution of the disk, while a condenser C of moderate capacity is mounted between the brushes, so as to bridge the gap between them at breaking when the segment M leaves the brushes. A second pair of brushes B², heavy and good conducting, make contact with another segment N, carried on the insulating-disk D. The contact of segment N with brushes B² is made at about the time of the break between B and M. Contact of segment N with brushes B² is preferably broken a moderate interval before the renewed contact of the segment M with the brushes B. The brushes B² complete a circuit of which the secondary winding S is a part, inductively related to the first circuit P as intimately as possible. In the circuit of this winding S may be placed any desired means of utilizing the energy developed. I have shown three cells A of secondary battery connected in series. The terminals of the batteries may be connected to any useful work, or the batteries may be charged separately and removed for use from the circuit of the secondary S. The counter electromotive force of the battery should be small in relation to the electromotive force developed by the secondary S, so that the secondary may be substantially on short circuit.

The operation of the device is as follows: The disk D, being revolved by any suitable means at a proper rate, closes the circuit of the primary P from the mains $a\,b$ during a certain interval, allowing a current to begin, which is opposed by the self-induction of the core and coil. This increases up to the point of the breaking between segment M and brushes B, at which moment the circuit of the primary P is quickly ruptured; but at the same or nearly the same instant the secondary S has its circuit closed by segment N making contact with brushes B², so that the rupture of the primary P is made at a time when there is a well-closed secondary of low resistance. The secondary S is made especially large in section and the ohmic resistance reduced as far as can be. I am thus able to use a greater counter force or resistance in the receiving-cells or other devices supplied with energy. The condenser C acts, as usual, to kill whatever slight self-inductive spark might otherwise be produced. If the primary coil P could be interspersed or intermingled with the secondary S, so as to make the secondary S a complete substitute for the primary coil, very little inductive effect would be produced on breaking; but as this cannot be done a slight inductance remains, which is taken care of by the condenser C. The pulse of current set up in S, which is practically a closed circuit, lasts for an interval of time, and this current slows the discharge of magnetism of the core I, the magnetism disappearing and at the same time keeping up the current in S. By the time that the magnetism has fallen so that the current in S is nearly stopped this circuit is broken by the segment N leaving the brushes B². A renewed closure through the primary P takes place and the same actions are repeated as before. The current in the primary P then is a unidirectional current increasing up to the point of break. The current in S is an intermittent current in one direction, due to the collapse of the magnetic lines of the core I, and it represents in energy the value of the magnetic energy of the core. The current in S begins at a certain value and fades away as the energy of the core is exhausted. During this time the batteries or other devices receive the discharge-current and may be charged or operated thereby.

Fig. 2 is a diagram showing one way of applying my invention in practice. In this figure, $a\,b$ are the connections to the feeding-line. P is the primary; C, the condenser; B, the set of brushes; M, the segment for them; S, the secondary closed through the cells A A A to be charged at or near the time of breaking between M and B, the brushes B² and segment N being arranged for this purpose. Connections in shunt to the battery-cells A A A are taken through the primary coil P² of an induction-coil the secondary S² of which is of fine wire and is arranged to give high potentials between its terminals for working vacuum-tubes or other suitable devices. A third pair of contacts B³ and segment O complete at intervals the circuit of the batteries A A A through the primary P², while a condenser C² bridges the break formed by the leaving of the segment O from the contact-brushes B³. The arrangement is the same as in Fig. 1 except that the extra contact at B³ is made at intervals, shunted by a condenser C², and the battery-current from the cells A is employed to work the primary P² of the induction-coil. The break between B³ and O could be replaced by any ordinary break-piece, automatic or otherwise, connected with the coil P². The sequence of the actions is the same as before except that the current from the battery is at intervals sent through the primary P², and the moment of the passage of this current may be so chosen by the setting of the contact-making segment O as to give the maximum effect. For example, if contact at B³ is broken when the current in S is at a maximum in charging the battery the effect in the induction-coil P² S² will be at a maximum. I am thus able to transfer energy without undue sparking from a circuit at any usual potential and employ it to work the induction-coil P² S² without the use of dead resistances.

Fig. 3 shows how my invention may be employed to work without the agency of the storage cells a high-potential induction-coil. In this case the coils P and S bear the same relation to the brushes B. A condenser C is likewise employed; but the circuit of the secondary S is made directly through the primary P² and brushes B² make contact with segment N. The condenser C² shunts the brushes B². In this case the secondary S has such a number of turns that the counter induction in the primary P² at any time is easily overcome by the superior electromotive force generated in the secondary. Thus the coil S is practically upon closed circuit. The passage of current through primary P and its rupture at the moment the circuit through S is closed gives rise to an induced current in S, which soon reaches a maximum value, traversing coil $P^2$ in series with S. At the time of this maximum value it is desirable to rupture this circuit by the segment N leaving the brushes $B^2$. When this circuit is interrupted, an induced current in the secondary $S^2$ is set up in much the same manner as by breaking the primary of a Ruhmkorff induction-coil.

The details of construction and arrangement of the coils and of the break-piece may be varied widely without departing from the principle of my invention, which is to store energy in a magnetic core by magnetizing it from a line-current traversing the magnetizing-coil and to break the circuit of this coil at or about the same instant that the circuit of a secondary winding on the same core is closed, whereby the magnetic energy in the core is again converted without spark at the break-piece into electric energy in the secondary or substitute winding and takes the form of a current more or less prolonged, which may be used to do work. The avoidance of waste by ohmic resistance in the coil S results in nearly all of the energy in core I being delivered to the work, notwithstanding the fact that the secondary S works on closed circuit.

What I claim as new, and desire to secure by Letters Patent of the United States, is—

1. In an apparatus for inductively transferring electric energy, the combination of a primary circuit and means for rupturing said circuit, a normally open secondary circuit in inductive relation to the primary circuit, and means for closing the secondary circuit at about the time of rupture of the primary.

2. In an apparatus for inductively transferring electric energy, the combination of a primary circuit carrying unidirectional current, a secondary circuit in inductive relation thereto, means for periodically rupturing the primary circuit at about the moment of maximum current-flow, and means for closing the secondary circuit upon itself at about the time of rupture of the primary.

3. A device for the inductive transfer of electric energy, comprising primary and secondary circuits inductively related, and a commutating device for closing the secondary circuit upon itself as the primary is opened.

4. A device for the inductive transfer of electric energy, comprising primary and secondary circuits inductively related, the secondary circuit being a normally open one, a commutating device for opening the primary circuit and at about the same time closing the secondary, and a condenser in shunt to the terminals of the primary circuit.

5. In combination, a circuit carrying unidirectional or continuous current of relatively high potential, an inductive device consisting of primary and secondary circuits upon a common core, a commutating device having contacts for connecting and disconnecting the main circuit with the primary of the inductive device, and for closing the circuit of the secondary upon itself; the arrangement of the contacts being such that the primary circuit is opened and the normally open secondary circuit is closed at approximately the same time, whereby the energy released in breaking the primary is transferred to the secondary.

6. In combination, a main circuit carrying current of relatively high potential, an inductive device comprising primary and secondary circuits on a common core, a break-piece or commutator having contacts arranged to open the primary circuit and close the secondary circuit at about the same time, and translating devices in the secondary circuit.

7. In combination, mains carrying current of relatively high potential, an inductive device supplied from the mains comprising primary and secondary circuits on a common core, a break-piece or commutator having contacts arranged to open the circuit of the primary and close the normally open secondary circuit at about the same time, and an induction-coil in the secondary circuit.

8. In combination, mains carrying current at relatively high potential, an inductive device supplied from the mains, comprising a primary and a secondary circuit on a common core, a break-piece or commutator, the contacts of which are arranged to open the primary circuit and close the secondary at about the same time, a storage battery in the secondary circuit, and an induction-coil in multiple with the storage battery.

In witness whereof I have hereunto set my hand this 23d day of February, 1897.

ELIHU THOMSON.

Witnesses:
JOHN W. GIBBONEY,
ALFRED PAUL.